United States Patent [19]

Tatsuno et al.

[11] Patent Number: 4,822,151
[45] Date of Patent: Apr. 18, 1989

[54] OPTICAL DEVICE WITH PHASE-LOCKED DIODELASER ARRAY

[75] Inventors: Kimio Tatsuno, Tokyo, Japan; Jan Opschoor, Eindhoven, Netherlands; Carolus J. van der Poel, Eindhoven, Netherlands; Ronald R. Drenten, Eindhoven, Netherlands

[73] Assignees: Hitachi Ltd., Tokyo, Japan; U.S. Philips Corporation, New York, N.Y.

[21] Appl. No.: 162,920

[22] Filed: Mar. 2, 1988

[30] Foreign Application Priority Data

Oct. 19, 1987 [EP] European Pat. Off. ......... 87201996.3

[51] Int. Cl.⁴ ............................................... G02F 1/01
[52] U.S. Cl. ............................. 350/401; 350/402; 356/365; 369/121; 369/122
[58] Field of Search ............... 350/169, 174, 400, 401, 350/402, 403, 405; 369/121, 122; 372/97, 100, 103, 105, 106; 356/351, 354, 363, 365, 368, 384, 401

[56] References Cited

U.S. PATENT DOCUMENTS

| | | | |
|---|---|---|---|
| 3,969,573 | 7/1976 | Bouwhuis et al. | 350/401 |
| 3,969,576 | 7/1976 | Boonstra et al. | 369/122 |
| 4,160,269 | 7/1979 | Kramer et al. | 369/122 |
| 4,517,667 | 5/1985 | Sprague | 369/122 |
| 4,607,359 | 8/1986 | Matsubayashi et al. | 369/121 |
| 4,722,089 | 1/1988 | Botez et al. | 372/97 |
| 4,723,253 | 2/1988 | Hayakawa et al. | 372/97 |
| 4,742,526 | 5/1988 | Matsui et al. | 372/97 |

*Primary Examiner*—John K. Corbin
*Assistant Examiner*—Martin Lerner
*Attorney, Agent, or Firm*—F. Brice Faller

[57] ABSTRACT

A polarization-rotator (22) and a polarization-sensitive beam combiner (30') are arranged in the radiation path between a phase-locked diode laser array (10) radiating in a stable supermode and a collimator lens (46). The two radiation lobes (11, 12) are superposed so that a single radiation spot (S) can be obtained. The quality of the spot can be improved by an arrangement of a prism system (40) and a spatial filter (45) in the lateral far field.

14 Claims, 5 Drawing Sheets

OPTICAL DEVICE WITH PHASE-LOCKED DIODELASER ARRAY

BACKGROUND OF THE INVENTION

The invention relates to an optical device for delivering a single radiation beam, having a phase-locked diode laser array and a collimator. The lens laser array radiates in a stable supermode having, in a lateral plane through the axis of symmetry of the radiation and parallel to the pn-junction layer of the laser array, two far field lobes. The invention also relates to an apparatus for scanning an information medium, such as an optical disc recorder and/or player or a laser printer, comprising such optical device.

The paper "Phased Array Diode Lasers" in "Laser-Focus/Electro Optics", June 1984, W Streifer et al, describes a phased-locked diode laser array which is a special kind of multi-emitter semiconductor laser. There is an increasing interest in phase-locked diode lasers because they can deliver a considerably higher output power than a single-emitter diode laser. For many applications it is necessary to focus the output power of all of the emitters into a single, circularly and diffraction-limited spot with as high efficiency as possible. Such focussing cannot be carried out by a high-aperture objective lens solely, because of the specific radiation pattern of the phase-locked laser array.

Such an array with N emitters radiates in N so-called supermodes, and the laser itself selects that or those, supermode(s) for which its threshold current is minimum. The threshold current is the value of the electric current perpendicular to the p-n-junction layer at which the laser action starts. The specific internal structure of a diode laser array determines the favoured radiation mode of this array.

As disclosed in the mentioned paper in "Laser-Focus/Electro Optics", June 1984, the so-called highest order supermode is, may be the favoured one. In this mode the radiation of each emitter is $\pi$ radians out of phase with that of its two neighbour emitters. Because of this phase shift the highest order supermode is stable up to high power. The diode laser array may also radiate in other supermodes which are also stable. In general a stable supermode is one for which the radiation of some emitters have a first phase which is always $\pi$ radians different from a second phase which the radiation of the other emitters have at that time.

In the theory of diode laser arrays the terms "near field phase- or intensity distribution" and "far field phase- or intensity distribution" are used. The former is the distribution at the position of the emitting facet of the diode laser array, or in a plane conjugate to this facet. The far field phase- or intensity distribution is the result of the interference of the individual beams emanating from the individual slit-shaped emitters of the array. The far field distribution is formed at some distance from the emitting facet. The near-and far field in this application are reserved for those fields in the lateral plane, i.e. the plane through the axis of the radiation pattern and parallel to the pn-junction layer. The plane perpendicular to the pn-junction layer and through the axis is the transversal plane.

The highest order and other stable supermode have two radiation lobes in the far field. The paper of W. Streifer et al does not disclose how a single beam, suited for forming a single radiation spot, can be obtained from a diodelaser array radiating in these modes.

SUMMARY OF THE INVENTION

In an optical device with a phase-locked diode laser array radiating in a stable supermode and delivering a single radiation beam a polarisation rotator in the path of one of the lateral lobes and a polarisation-sensitive beam combiner in the paths of both lateral far field lobes are arranged behind the collimator lens, in that order.

The polarisation rotator changes the polarisation direction of the radiation of one of the lobes, such that this direction becomes perpendicular to that of the radiation of the other lobe. The polarisation-sensitive beam combiner, in the form of a composed birefringent element, combines the radiations of the two lobes in one lobe. Because the radiations of the two lobes have mutually perpendicular polarisation directions these radiations do not interfere with each other. This principle of lobe superposition in a laser array device can be realized with different embodiments.

In a first embodiment, the beam combiner is a prism of Wollaston, and between the polarisation rotator and the prism of Wollaston a composed beam deflector is arranged for directing the axes of the radiations of the two lobes such as to intersect at the prism of Wollaston.

The composed beam deflector preferably is a double optical wedge. Compared with a system of separate mirrors, such wedge has the advantage of being simple and easy to assemble in the device.

A prism of Wollaston can be composed of two component prisms of uniaxial birefringent material and having mutually perpendicular optical axes. Such a composed prism can combine the radiations of two lobes for which the angle between the axes of the lobes does not exceed a certain value.

In order to enable lobes with larger angles between their lobe axes to be combined, the prism of Wollaston preferably includes three component prisms of birefringent material arranged after each other, the two outer component prisms having the same optical axis and substantially the same shape and dimensions, while the central component prism has a different shape and different dimensions and an optical axis perpendicular to the optical axis of the outer component prisms. This prism of Wollaston can deflect an incident beam under larger angles than a two-component prism of Wollaston and moreover has the advantage of being symmetric.

In a second embodiment the polarisation-sensitive beam combiner comprises a first and a second birefringent plate which are parallel to each other, the optical axes of the plates having different directions each at 45 degrees with the plate surfaces and crossing each other.

The combination of the two plates, known as Savart Plate or Savart Polariscope, does not only combine the two lobes into one single lobe but also bends the axes of the two lobes towards each other. Thus, up to a certain value of the angle between the axes of the lobes, no separate beam deflector is needed.

For superposing two lobes with a larger angle between their axes, the second embodiment may be further characterized in, that a beam deflector is arranged between the collimator lens and the first birefringent plate.

Between the first and the second birefringent plate a $\lambda/2$-plate may be arranged wherein $\lambda$ is the wavelength of the diode laser radiation. This $\lambda/2$-plate rotates the polarisation direction of the radiation from the first plate before it enters the second plate. Thus the Savart-plate can deflect over larger angles, so that also two diode laser lobes which, at the entrance face of the Savart-plate, have a larger mutual distance, can be superposed.

Besides the two central lobes, which can be superposed to one lobe, the radiation pattern of the laser diode array also has side lobes. Moreover, the wavefront of the diode laser array is astigmatic and the dimension of the radiation pattern in the lateral plane is considerably smaller than that in the transversal plane. A device according to the invention which delivers a single high intensity radiation beam with circular cross-section and free of astigmatism is preferably further characterized in, that behind the polarisation-sensitive beam combiner are arranged, in this order, a prism system of at least one prism having in the lateral plane an entrance face inclined with respect to the axis of the incident radiation and an exit face perpendicular to the axis of the emergent radiation, and a spatial filter in the lateral far field of the diode laser array.

The prism system broadens the central lobe in the lateral plane so that its lateral width becomes equal to the transversal width. The spatial filter blocks the unwanted lobes and transmits only the enlarged central lobe. Besides of its anamorphic function the prism system also has a de-astigmatic effect. The collimator lens is so dimensioned and arranged that some wavefront sphericity remains in the beam, especially in the lateral plane. As is known, when a divergent or convergent beam passes through a skew prism this prism will impart astigmatism to the beam. The astigmatic effect of the prism system is used to correct for the astigmatism of the diode laser array.

These functions of the prism system could also be performed by an arrangement of cylindrical lenses. The prism system however has the advantage that it is compact and less sensitive to tilting or shifting with respect to the optical axis of the device.

The prism system may comprise one prism, two prisms of four prisms. When using more prisms for obtaining the same lateral enlargement of the central lobe, the enlargment power of the prisms is reduced, so that less stringent requirements are to be set to the alignment and the tolerances of the prisms. On the other hand, with a given enlargment power of the prisms, when increasing the number of prisms, the enlargment power of the prism system is increased. This is of importance when the number of radiating stripes in the diode laser array is increased.

The invention may advantageously be used in an apparatus for optically recording an optical record carrier and comprising an optical head for generating a radiation spot modulated in intensity according to the information to be recorded, because of the relative high recording intensity involved. The optical head includes an optical device as described hereinbefore and an objective lens for focusing the beam from said device into a diffraction-limited round spot on the record carrier.

The invention may also be used in an apparatus for reading a record carrier and comprising an optical head wherein a radiation spot for scanning the record carrier is generated. The optical head includes an optical device as described hereinbefore and an objective lens for focussing the beam from said device into a diffraction-limited round spot on the record carrier.

The invention may also be used advantageously in an apparatus for laser printing information on a recording-medium comprising a recording medium carrier movable in a first direction and a beam deflector for scanning a radiation beam along a second direction perpendicular to the first direction. This apparatus includes an optical device as described hereinbefore for generating a substantially collimated beam that is focussed by an objective lens to a diffraction-limited radiation spot on the recording medium.

DETAILED DESCRIPTION OF THE PREFERRED EMBODIMENT

Figure 1:
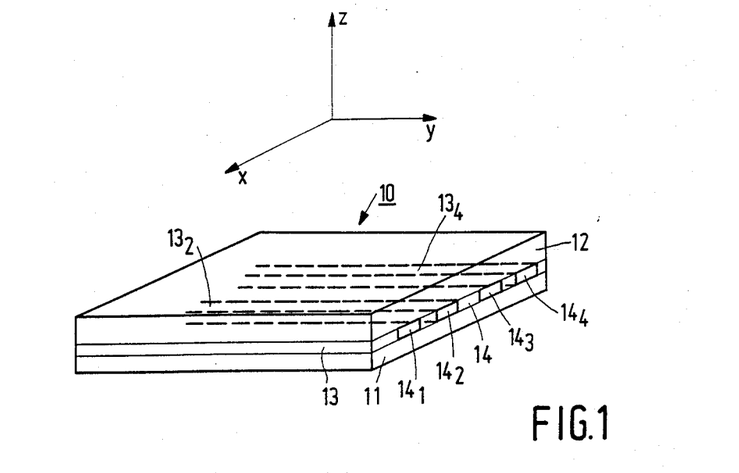
FIG. 1 shows, in perspective view, a semiconductor diode laser array.

FIG. 1 shows schematically and in perspective view a multi-emitter semiconductor diode laser, a so-called phase-locked laser array. This diode laser has a first layer 11 of p-type material, a second layer 12 of n-type material and an intermediate layer 13, or pn-junction layer, wherein the laser action takes place when an electric current above a certain threshold value is sent through the laser unit in the z-direction. The laser radiation emanates through the front facet, or cleaved surface, 14 of the layer 13 and propagates in the Y-direction. This radiation shows a first, small, divergence in the XY-plane, called the lateral plane, and a second, greater, divergence in the YZ-plane, called the transversal plane.

The pn-junction layer comprises a number of radiation guiding stripes $13_1$, $13_2$, etc. which are separated from each other by individual emitters $14_1$, $14_2$, etc. For clearness sake in FIG. 1 only four guiding stripes are shown but their number may amount to ten or more. As is known, such a phase-locked laser array provides the advantage of a considerably increased power output relative to a single emitter diodelaser, so that the laser array is very well suited to record information on an optical medium like an optical disc or the recording medium of a laser printer. The radiation of all of the individual emitters $14_1$, $14_2$, etc. should then be concentrated into a single, round and diffraction-limited radiation spot. Besides a combination of a first lens which collimates the radiation and a second lens which focusses the radiation, additional optical elements are needed, because of the specific radiation pattern of a diode laser array.

Figure 2A:
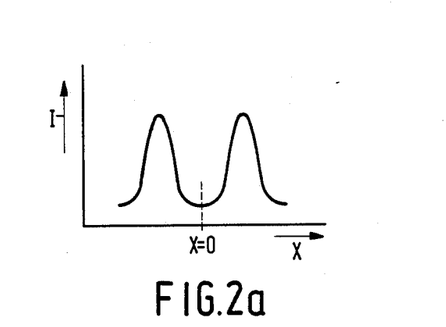
FIGS. 2a, 2b, 2c and 2d represent the near-field intensity and phase distribution and the far-field intensity and phase distribution of a two-emitter diodelaser respectively.
Figure 2B:
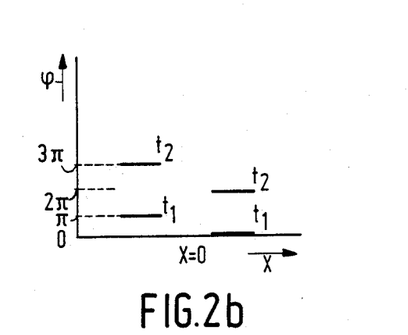
Figure 2C:
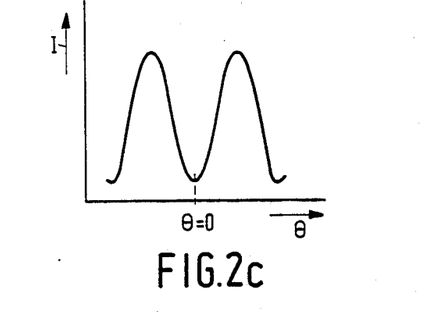
Figure 2D:
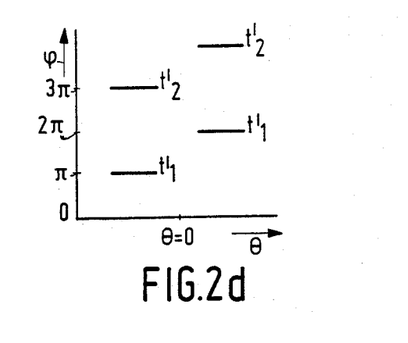

As is known, for example from the mentioned paper in "Laser-Focus/Electro Optics", June 1984 issue, an N-emitter laser array can be so constructed that it radiates in the highest order supermode. In this mode the adjacent emitters radiate in anti-phase. This mode is very stable up to high power, but the far field radiation pattern exhibits two central lobes instead of one. In FIG. 2 the intensity- and phase distribution of a phase-locked diode laser array in the near-field and far field are shown. For the sake of simplicity a two-emitter array is taken. FIG. 2a gives the intensity (I) distribution and FIG. 2b the phase ($\phi$) at different positions along the X-axis. $X=0$ corresponds to the centre of the laser array. The phase is given for different times (t). The intensity and phase, distributions in the far field are shown in FIGS. 2c and 2d respectively. In these FIGS. $\theta$ is the angular position in the far field relative to the optical axis ($\theta=0$) of the device.

From FIG. 2d it is clear that the radiations of the two lobes are vibrating in anti-phase in the case of a two emitter array. This holds for each N-emitter array for which N is an even number. For laser arrays with an odd number of emitters there is no phase shift of $\pi$ radians between the two lobes. In the latter case the near-field phase distribution is symmetrical relative to the centre of the array, whereas in the case of an even number of emitters the near field phase distribution is asymmetrical relative to the centre of the array. The phase distribution of each far-field lobe is so uniform that each of the two lobes can be focussed into a single spot.

Instead of the highest order supermode, the diode laser array may also radiate into other stable modes which also have a dual lobe far-field pattern. In general, dual lobe pattern is obtained when the radiation of some of the emitters shows a phase difference of $\pi$ radians with that of the remaining emitters.

A single spot of the stable diode laser array could be obtained if one of the lobes would be blocked. But then half of the radiation energy is lost. According to the present invention the radiations of the two lobes are united into one lobe.

Figure 3A:
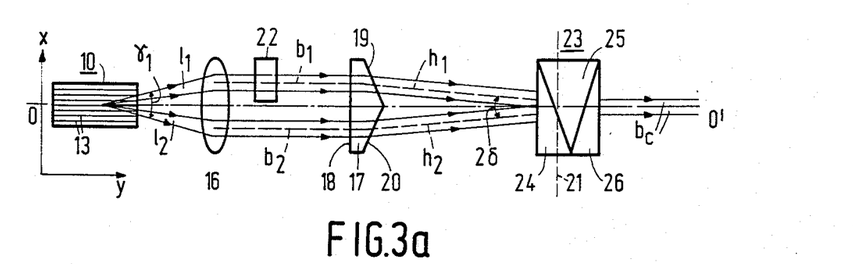
FIGS. 3a and 3b shows a first embodiment of the optical device according to the invention in lateral and transversal section, respectively.
Figure 3B:
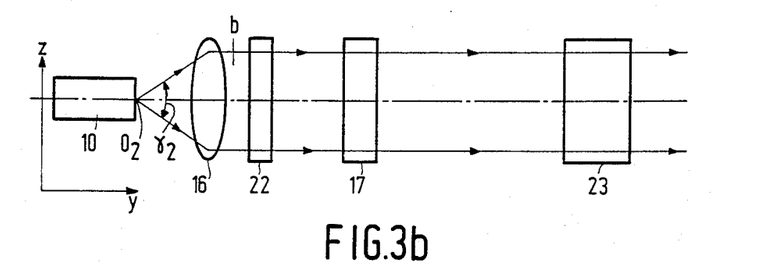

Referring to FIGS. 3a and 3b, diode laser array 10 with radiation guiding stripes emits a radiation pattern which in the transversal plane is a single beam b with opening angle $\gamma_2$. In the lateral plane the radiation pattern has an opening angle $\gamma_1$ and at some distance from the laser facet, so in the far-field, it is composed of two radiation lobes $l_1$ and $l_2$. Behind the laser array 10 a collimator lens 16 is arranged, which provisionally for facilitating the description is supposed to collimate the radiation both in the transversal and lateral plane, so that in the lateral plane the two radiation lobes are converted into two collimated subbeams $b_1$ and $b_2$. These beams pass through an optical element 17 which in the lateral plane has the shape of a double wedge with a plane entrance face 18 and two inclined exit faces 19 and 20 for the subbeams $b_1$ and $b_2$ respectively. At the latter faces refraction occurs so that the subbeams are broken towards the optical axis OO' of the device. The deflected subbeams overlap each other in a plane 21. The chief rays $h_1$ $h_2$ of the subbeams $b_1$ and $b_2$ make an angle $2\delta$ with each other, so that behind the plane 21 these beams would again diverge from each other.

The chief rays $h_1$ and $h_2$ are made to coincide by using polarisation-sensitive optics in the form of a $\lambda/2$-plate 22 and a prism of Wollaston 23. The $\lambda/2$-plate, wherein $\lambda$ is the wavelength of the radiation, rotates the polarisation direction of the subbeam $b_1$ so that it become perpendicular to the plane of the drawing when the radiation emitted by the diode laser array is linearly polarised with the polarisation direction parallel to the plane of the drawing. The prism of Wollaston 23 may comprise two component prisms which are triangular shaped and consist of an uniaxial birefringent material like quartz. The optical axes of the component prisms are perpendicular to each other. A is known, such a prism of Wollaston deflects an incident beam under either one of two equal but opposite angles depending upon whether the polarisation direction of this beam is parallel or perpendicular to the optic axis of one of the component prisms. When the chief rays $h_1$ and $h_2$ of the subbeams $b_1$ and $b_2$ make angles of $-\delta$ and $+\delta$ respectively with the optical axis OO', the prism of Wollaston can bend these chief rays so that both chief rays become coincident with the optical axis OO' of the device.

The embodiment of FIG. 3a comprises a special kind of prism of Wollaston. This prism and the paths of the beams $b_1$ and $b_2$ through it are shown in more detail in FIG. 4. The prism consists of three component prisms 24, 25 and 26 of uniaxial birefringent material. The outer component prisms 24 and 26 have the same shape and dimensions and their optical axis 27 and 29 are parallel to each other and to the plane of the drawing. The central component prism has another shape and dimensions and its optical axis 28 is perpendicular to the plane of the drawing.

Figure 4:
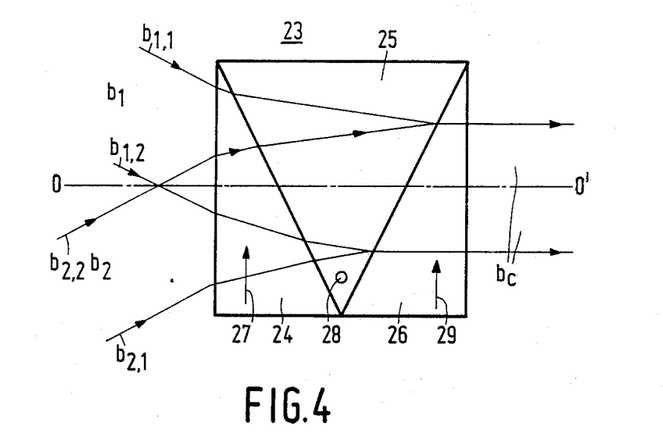
FIG. 4 illustrates the ray paths through the prism of Wollaston used in this embodiment.

For each of the component prisms it holds, that when the boundary rays. $b_{1,1}$, $b_{1,2}$ of the beam $b_1$ passes through it as ordinary rays, the boundary rays $b_{2,1}$, $b_{2,2}$ of the beam $b_2$ pass through it as extra-ordinary rays. Whether a ray is ordinary or extraordinary depends on the polarisation direction of the beam with respect to the direction of the optical axis of the said component prism. The orientation of the boundary faces of the component prisms and their ordinary and extra-ordinary refractive indices can be chosen such that the beams $b_1$ and $b_2$ coincide after passage through the composed prism.

The prism of Wollaston of FIG. 4 with three component prisms can deflect an incident beam under larger angles than a prism of Wollaston with two component prisms. Moreover the FIG. 4 prism of Wollaston has a symmetric construction. A further advantage of the prism of FIG. 4 is that the component prisms 24 and 26 which have the same optical axis also have the same shape while the component prism 25 with a different direction of the optical axis also has a different shape. This prevents that during assembling of the composed prism 23 the component prisms with different optical axis might be interchanged.

Instead of a prism of Wollaston, other composite prisms having component prisms of birefringent material and different optical axes, like a prism of Rochon, may be used.

Figure 5A:
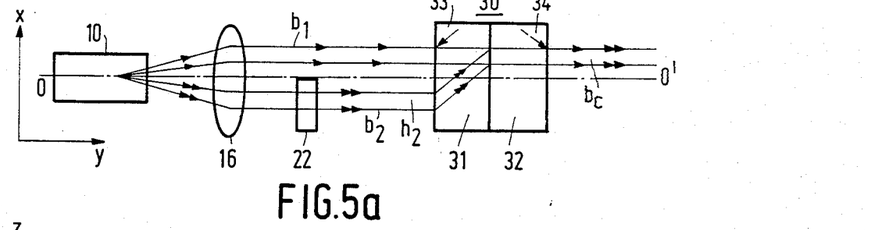
FIGS. 5a and 5b represent a second embodiment of the device in lateral and transversal section respectively.
Figure 5B:
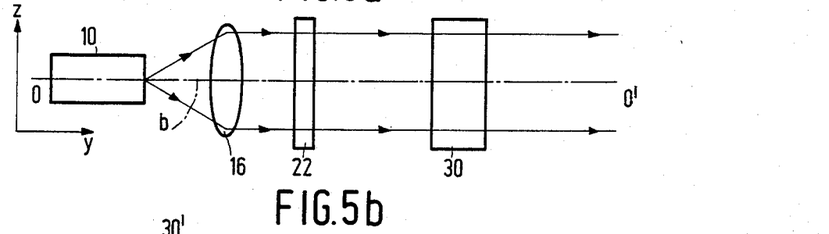

In FIGS. 5a and 5b the double wedge and the prism of Wollaston are replaced by a single element 30 known as a Savart-plate or -polariscope which consists of first and second plane parallel plates, 31 and 32 respectively, of uniaxial birefringent material such as quartz. The plates 31 and 32 have respective optical axes 33 and 34 at an angle of 45 degrees with the plane surfaces, whereby axis 33 is perpendicular to axis 34.

A Savart-plate can superpose two beams with mutually perpendicular polarisation directions. In the transversal plane of FIG. 5a one of the beam, for example $b_2$, traverses plate 31 as an extra-ordinary beam and becomes an ordinary beam in the plate 32, because the optical axis 34 of this plate is perpendicular to axis 33 of plate 31. The beam $b_2$ is consequently deflected in plate 31 and passes undeflected through plate 32. The beam $b_1$ traverses plate 31 as an ordinary beam and becomes an extra-ordinary beam in plate 32 in the transversal plane. However in the transversal plane both beams have the same polarisation direction and consequently pass through the plate 32 in the same way. In the lateral plane the beam $b_2$ becomes coincident with beam $b_1$. The two-component Savart-plate 30 of FIG. 5a can superpose two mutually perpendicular polarised beams which are not too far apart.

Figures 5C, 6A:
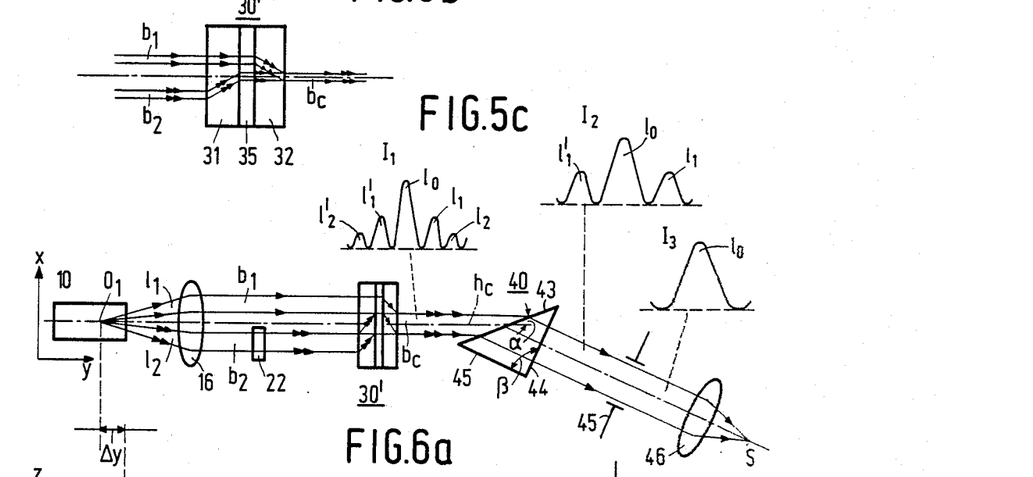
FIG. 5c represents a modified Savart-plate for use in this second embodiment.
FIGS. 6a and 6b shows a first modification of an embodiment of the device having a prism system and a spatial filter.

When the distance between the two beams $b_1$ and $b_2$ is larger, the modified Savart configuration 30' shown in FIG. 5c can be used. This configuration is different from the configuration 30 in FIG. 5a in that a $\lambda/2$-plate 35 is arranged between the plates 31, 32. This plate 35 rotates the polarisation directions of the beams $b_1$ and $b_2$ from the plate 31 over 90 degrees before they enter the plate 32. The beam $b_1$ is then an extra-ordinary beam in the lateral plane for the plate 32 and is deflected towards beam $b_2$. With the $\lambda/2$-plate 35 between the plates 31 and 32, the effective angle over which the beams are deflected towards each other is twice that over which an unmodified Savart-plate can deflect.

It is also possible to arrange a beam deflector between the modified- or unmodified Savart configuration and the collimator lens 16.

The radiation pattern emerging from the Savart-configuration in FIGS. 5a or 5c or from the prism of Wollaston in FIG. 3a and 3b is in principle suited to be focussed into one spot. However, besides a central lobe this radiation pattern has lobes which, upon focussing of the radiation pattern, may interfere with the central lobe thereby generating an interference pattern of dark and light areas in the spot.

Moreover in the lateral plane the point of origin of the original two central lobes, which are united into one central lobe, is situated behind the front facet of the laser, whereas in the transversal plane this point is located at the front facet. The central lobe, and the laser array radiation as a whole, show astigmatism in an analog way as a single-emitter diode laser of the gain-guided type. In order to obtain a single diffraction-limited, aberration free, spot this astigmatism should be eliminated.

The laser array has a linear shaped emitter; an array of ten emitters for example measures 40 $\mu$m $\times$ 2 $\mu$m. The aperture of the composed beam emitted by the diode laser array 10 is relatively small in the lateral plane and relatively large in the transversal plane. Downstream from the emitting facet the composed radiation beam has an elliptical cross-section and for obtaining a round spot the beam should be reshaped so that its cross-section becomes circular.

The radiation from the prism of Wollaston or from the Savart-plate can be formed into a beam which is suited to be focussed into a single, round and diffraction-limited spot by enlarging the radiation pattern in the lateral plane and by filtering the central lobe, whereby the functions of enlarging, beam shaping and astigmatism elimination can be performed by one and the same prism system.

Figure 6B:
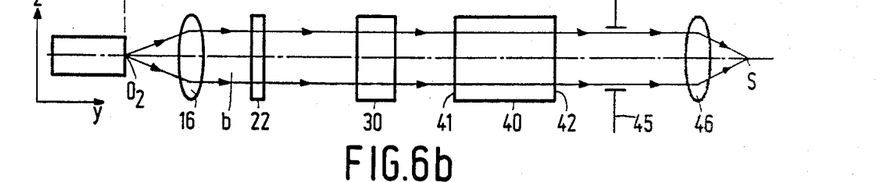

The FIGS. 6a and 6b show, in lateral and tranversal section respectively, a first embodiment of such prism system 40 in combination with the optical device of FIGS. 5a and 5b. The lens power and the axial position of the collimator lens 16 are chosen such that it nearly collimates the beam $b_c$ in the transversal plane. In the lateral plane, however, the wavefront of the beam $b_c$ after passage through the lens 16 is more curved, due to the $\Delta y$ shift of the point of origin $O_1$ in this plane. The prism 40 arranged behind the Savart-plates 30' only slightly affects the beam in the transversal plane, because in this plane the beam is nearly perpendicular to the entrance face 41 and the exit face 42 of the prism. In the lateral plane, however, the entrance face 43 is arranged at an angle $\alpha$ with the axis $h_c$ of the beam. At face 43 refraction occurs such that the beam widened, in dependency of the angle $\alpha$. This means that the far field radiation pattern of the laser array radiation is spread, as is illustrated in the upper part of FIG. 6a wherein the far field intensity as it leaves exit face 44. This pattern at different positions along the optical path are shown. $I_1$ represents the intensity pattern entering face 43 and $I_2$ represents the intensity pattern leaving face 44. Behind the prism 40 a diaphragm 45 is arranged. The opening of this diaphragm and the orientation and parameters of the prism 40 are so adapted to each other that the diaphragm passes only the central lobe $l_0$ of the radiation pattern and blocks all of the sides lobes $l_1$, $l_1$ etc. $I_3$ represents the intensity pattern emerging from diaphragm 45.

Thus a beam is obtained which has such distribution that it can be concentrated by an objective lens 46 in a single spot S. By adapting the numerical aperture of this lens to the beam cross-section, so that the lens pupil is adequately filled, a diffraction-limited spot having minimal dimensions is obtained.

Care is taken that the enlargement of the beam in the lateral plane is such that the beam dimension in this plane is equal to that in the transversal plane, so that the beam leaving the prism has a circular cross-section and consequently the spot V is round.

Because in the lateral plane the beam passing through the skew prism is not collimated, the prism imparts astigmatism to the beam. It can be arranged such that this astigmatism compensates the astigmatism of the diodelaser array, so that the wavefront of the beam from the prism has the same curvature in the lateral and transversal planes.

The angle $\beta$ between the faces 44 and 45 of the prism 40 may have an arbitrary value. In practice it is preferred that this angle is 90 degrees because of easier manufacturing and assembling. These remarks hold also for the other embodiments of the prism system to be described yet.

Figure 7A:
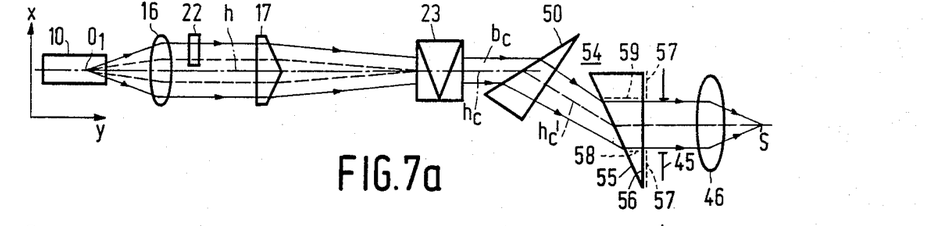
FIGS. 7a and 7b represent a second modification of this embodiment.
Figure 7B:
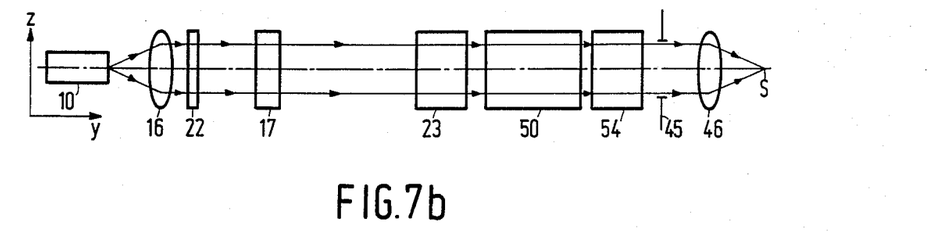

The first of these embodiments is shown in FIGS. 7a and 7b, in lateral and transversal cross-section respectively, and comprises two prisms 50 and 54. By using a second prism it becomes possible to bend the axis $h_c'$ back so that it is parallel to the axis $h$ of the incident radiation. The transversal dimension of the device is decreased, which is of importance especially when the device is to be used in an optical disc recorder/player. Moreover, in the embodiment of FIGS. 7a and 7b less beam widening power for each prism is needed so that less stringent requirements are to be set to the alignment and the tolerances of the prisms.

Figure 8A:
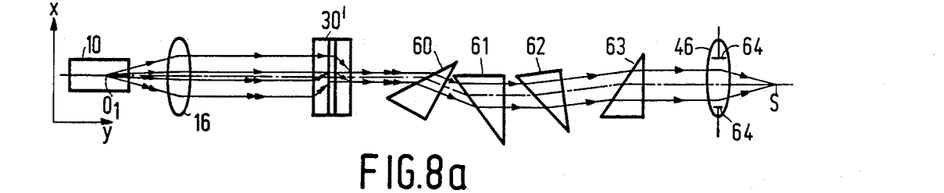
FIGS. 8a and 8b show the third modification of this embodiment.
Figure 8B:
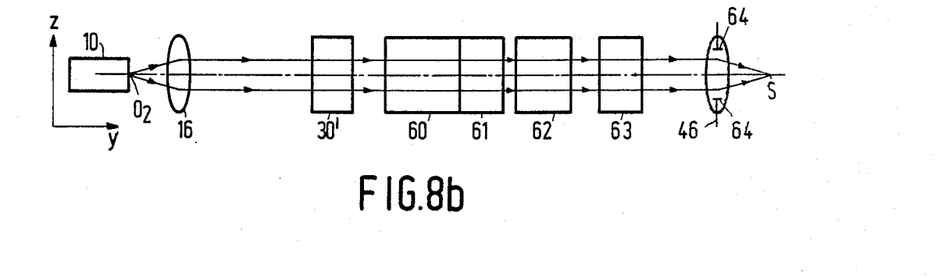

FIGS. 8a and 8b shows the embodiment of the optical device with four prisms 60, 61, 62 and 63. Besides the beam-widening power needed for each prism being further reduced, the embodiment has the advantage that axis $h_c'$ of the emergent radiation is coincident with axis h of the incident radiation, so that the device can be housed in a small tubular holder.

In the embodiment with two or four prisms the beam widening power is preferably equally divided over the prisms. The prisms preferably have the same shape and dimensions, which considerably decreases the manufacturing costs of the device.

In the embodiments of FIGS. 6, 7 and 8 the spatial filter may be constituted by a separate element (45) in the form of a diaphragm on a separate holder. It is also possible that such diaphragm is fixed to the exit face 44 or 56, of the last prism in the embodiments of FIGS. 6 and 7 respectively and of FIG. 8. As indicated in FIG. 7a it is also possible to apply an opaque coating 57, leaving a central opening, on the exit faces. Another possibility is that the boundaries of the last prism form a natural stop for the radiation towards further optical elements of the optical apparatus, as indicated in FIG. 7a by the interrupted lines 58, 59. Finally in an apparatus wherein the spot forming lens 46 is arranged close to the last prism (63, 54, 40) of the prism system, the spatial filter may be formed by the pupil of the spot forming lens, as indicated by 64 in FIGS. 8a and 8b.

Figure 9:
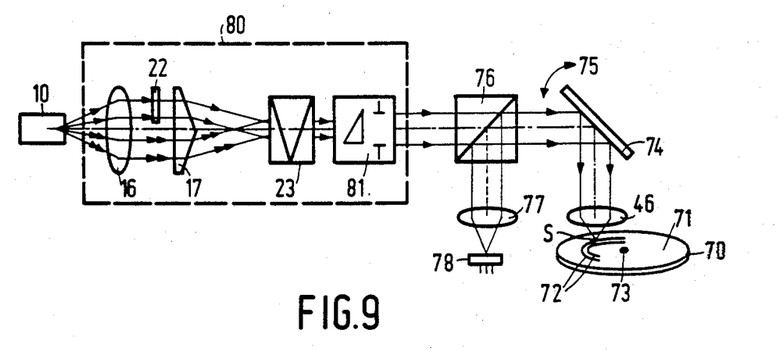
FIG. 9 represents an apparatus for recording an optical record carrier comprising the device of the invention.

FIG. 9 shows schematically an apparatus for recording information in a surface 71 of an optical record carrier 70. The surface 71 may be provided with pre-grooved servo tracks 72. The laser unit, preferably is phase-locked diode laser array designated 10, emits a beam b which should be focussed by an objective lens 46 to a high-intensity, round and diffraction-limited, radiation spot S on the information surface 71. According to the present invention a unit 80 is arranged between the laser array 10 and the objective lens 46 to convert the radiation from the laser array 10 into a collimated, rotationally symmetrical, beam. The unit 80 may include a collimator lens 16 and a system of a beam deflector 17 and a prism of Wollaston 23, or a Savart-plate, as shown in FIGS. 3, 4 and 5, which may be combined with a prism- and spatial filter system 81, as shown in FIGS. 6, 7 and 8.

Recording of an information track is performed by modulating the beam intensity in accordance with the information to be recorded and by rotating the record carrier around its axis 73. By gradually moving the whole optical head comprising elements 10, 80 and 46, or part of it, in the radial direction of the record carrier, all of the tracks can be successively recorded. A fine control of the spot S relative to a track can be performed by a mirror 74 which is pivotable in the direction of arrow 75. Modulation of the recording beam can be performed for example by modulating the electric current through the laser array 10.

By arranging a beam separator, for example a beam splitting prism 76, before or behind the unit 80, which separator directs part of the beam reflected from the record carrier, for example via a lens 77, towards a photosensitive detector 78, the apparatus of FIG. 9 can be used for reading the information recorded on the record carrier. During reading the beam has a constant intensity of such level that it cannot provoke any change in the recording surface.

Figure 10:
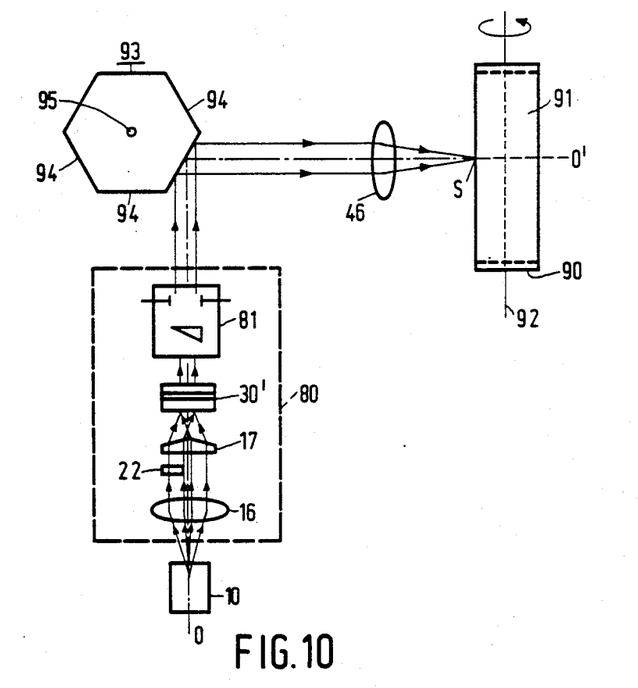
FIG. 10 shows a laser printer comprising this device.

FIG. 10 shows schematically a laser printer with a recording medium 91 wrapped around a drum 90 which, for recording successive lines, is rotated around its axis 92. Line scanning is performed by a polygon 93 carrying a number of mirror facets 94 and rotating around its axis 95. Objective lens 46 should focus the radiation from a phase-locked diode laser array 10 and reflected by a facet 94 to a round spot S of small diameter on the recording medium. The laser beam is modulated in intensity according to the information to be recorded, either by the electric current through the laser array or by a separate modulator in the path of the beam.

To convert the two lobed beam from the laser array radiating in a stable mode, which beam is divergent and has an elliptical wavefront, into a collimated beam with a rotationally symmetrical wavefront, a block 80 comprising a collimator lens 16 and a system of a beam deflector 17 and a Savart-configuration 30', or a prism of Wollaston, as shown in FIGS. 3, 4 and 5, which may be combined with a prism- and spatial filter system 81, as shown in FIGS. 6, 7 and 8, is arranged between the laser array 10 and the objective lens 46.

The invention is not restricted to information recording apparatus but can be used in all apparatuses wherein a high intensity small and round spot should be formed out of the radiation of a phase-locked diode laser array. As an example can be mentioned a projection TV-apparatus with light valves or Liquid Crystal Displays for modulating the laser radiation with (colour) TV information. The invention can also be used in long haul fiber optical communication systems or in surgical instruments.

What is claimed is:

1. Optical device for delivering a single radiation beam comprising in this order
   a phase locked diode laser array having a p-n junction layer with a plurality of emitters defining a lateral plane and an axis of symmetry, said array being constructed so that said emitters radiate in a highest order supermode in which the radiation of each emitter is $\pi$ radians out of phase with the radiation of the adjacent emitters and the far field radiation pattern exhibits two central lobes in the lateral plane,
   a collimator lens arranged in the path of the radiation from the emitters to collimate the radiation in the lateral plane, whereby the two radiation lobes in the lateral plane are collimated into two parallel collimated subbeams,
   a polarization rotator in the path of one of the subbeams,
   a polarization sensitive beam combiner in the path of both of said subbeams.

2. Optical device as claimed in claim 1, characterized in that the beam combiner is a prism of Wollaston, and in that between the polarisation rotator and the prism of Wollaston a composed beam deflector is arranged for directing the axes of the radiations of the two lobes such as to intersect at the prism of Wollaston.

3. Optical device as claimed in claim 2, characterized in that the composed beam deflector is a double optical wedge.

4. Optical device as claimed in claim 2, characterized in that the prism of Wollaston comprises three component prisms of birefringent material arranged after each other, the two outer component prisms having the same optical axes and substantially the same shape and dimensions, while the central component prism has a different shape and different dimensions and an optical axis perpendicular to the optical axes of the outer component prisms.

5. Optical device as claimed in claim 1, characterized in that the polarisation-sensitive beam combiner comprises first and second birefringent plates which are in parallel planes, the optical axes of the plates having different directions each at 45 degrees with the plates and crossing each other.

6. Optical device as claimed in claim 5, characterized in that a beam deflector is arranged between the collimatorlens and the first birefringent plate.

7. Optical device as claimed in claim 5, characterized in that between the first and the second birefringent plate a $\lambda/2$-plate is arranged, wherein $\lambda$ is the wavelength of the diodelaser radiation.

8. Optical device as claimed in claim 1, characterized in that behind the polarisation-sensitive beam combiner are arranged, in this order, a prism system of at least one prism having in the lateral plane an entrance face inclined with respect to an axis of incident radiation and an exit face perpendicular to an axis of emergent radiation, and a spatial filter in a lateral far field of the diode laser array.

9. Apparatus for optically recording an optical record carrier, comprising an optical head for generating a radiation spot modulated in intensity according to information to be recorded, wherein the optical head comprises an optical device for delivering a single radiation beam as in claim 1 and an objective lens for focussing the beam from said device into a diffraction-limited round spot on the record carrier.

10. Apparatus as in claim 9, wherein the objective lens has an entrance pupil which constitutes a spatial filter of the optical device.

11. Apparatus for reading a record carrier comprising an optical head wherein a radiation spot is generated for scanning the record carrier, wherein the optical head comprises an optical device for delivering a single radiation beam as in claim 1 and an objective lens for focussing the beam from said device into a diffraction-limited spot on the carrier.

12. Apparatus as in claim 11, wherein the objective lens has an entrance pupil which constitutes a spatial filter of the optical device.

13. Apparatus for laser printing of information on a recording medium, comprising a recording medium carrier movable in a first direction and a beam deflector for scanning a radiation beam along a second direction perpendicular to the first direction, characterized in that it comprises an objective lens and and optical device as in claim 1 for generating a substantially collimated beam that is focussed by said objective lens to a diffraction-limited radiation spot on the medium.

14. Apparatus as in claim 13, wherein the objective lens has an entrance pupil which constitutes a spatial filter of the optical device.

* * * * *